United States Patent
Ikeda

(10) Patent No.: US 9,309,812 B2
(45) Date of Patent: Apr. 12, 2016

(54) INTERNAL COMBUSTION ENGINE

(75) Inventor: Yuji Ikeda, Kobe (JP)

(73) Assignee: IMAGINEERING, INC., Kyogo (JP)

( * ) Notice: Subject to any disclaimer, the term of this patent is extended or adjusted under 35 U.S.C. 154(b) by 433 days.

(21) Appl. No.: 13/982,662

(22) PCT Filed: Jan. 31, 2012

(86) PCT No.: PCT/JP2012/052172
§ 371 (c)(1),
(2), (4) Date: Oct. 3, 2013

(87) PCT Pub. No.: WO2012/105572
PCT Pub. Date: Aug. 9, 2012

(65) Prior Publication Data
US 2014/0026849 A1    Jan. 30, 2014

(30) Foreign Application Priority Data
Jan. 31, 2011  (JP) .................. 2011-019085

(51) Int. Cl.
*F02M 27/04* (2006.01)
*F02P 15/04* (2006.01)
(Continued)

(52) U.S. Cl.
CPC .............. *F02D 7/00* (2013.01); *F02B 23/0624* (2013.01); *F02M 27/042* (2013.01); *F02P 15/04* (2013.01);
(Continued)

(58) Field of Classification Search
CPC .......... F02M 27/042; F02M 2027/047; F02M 61/1806; F02F 3/28; F02F 3/285; H05H 2001/463; H05H 1/04; F02D 7/00; F02B 23/08; F02B 23/0624; F02B 23/0645; F02B 23/0669; F02P 23/045; F02P 9/007; F02P 15/04

USPC ....... 123/301, 536, 149 F, 169 R, 143 B, 620, 123/298, 307, 193.6
See application file for complete search history.

(56) References Cited

U.S. PATENT DOCUMENTS 8,156,911 B2 * 4/2012 Ikeda .................... F02D 41/402
                                                     123/143 B
8,365,707 B2 * 2/2013 Ikeda ..................... F02B 23/08
                                                     123/536

(Continued)

FOREIGN PATENT DOCUMENTS

EP    2180177 A1    4/2010
JP    09-049432 A   2/1997
JP    2009-287549 A 12/2009

OTHER PUBLICATIONS

International Search Report of PCT/JP2012/052172, mailing date Jul. 31, 2012.

*Primary Examiner* — Lindsay Low
*Assistant Examiner* — George Jin
(74) *Attorney, Agent, or Firm* — Westerman, Hattori, Daniels & Adrian, LLP

(57) ABSTRACT

In an internal combustion engine 20 that promotes combustion of fuel injected from an injector 50 to a combustion chamber 21 by way of electromagnetic wave plasma, a plurality of pieces of the electromagnetic wave plasma are generated respectively for a plurality of jet flows injected from the injector 50. A plurality of antennae 36 are provided respectively for a plurality of injection holes of the injector 50. Each antenna 36 is disposed on an exposed surface 46a of a piston 46 exposed to the combustion chamber 21 at a location corresponding to each injection hole 55. While the injector 50 injects fuel, each antenna 36 emits the electromagnetic wave to the combustion chamber 21, thereby generating the electromagnetic wave plasma.

16 Claims, 6 Drawing Sheets

(51) Int. Cl.
 *F02D 7/00*     (2006.01)
 *F02B 23/06*    (2006.01)
 *F02P 23/04*    (2006.01)
 *F02F 3/28*     (2006.01)
 *H05H 1/46*    (2006.01)
 *F02B 23/08*    (2006.01)
 *F02P 9/00*     (2006.01)
 *F02M 69/04*    (2006.01)
 *F02M 61/18*    (2006.01)

(52) U.S. Cl.
 CPC ........... *F02P 23/045* (2013.01); *F02B 23/0645* (2013.01); *F02B 23/0654* (2013.01); *F02B 23/0669* (2013.01); *F02B 23/0672* (2013.01); *F02B 23/08* (2013.01); *F02B 2275/14* (2013.01); *F02F 3/28* (2013.01); *F02M 61/1806* (2013.01); *F02M 69/045* (2013.01); *F02M 2027/047* (2013.01); *F02P 9/007* (2013.01); *H05H 2001/463* (2013.01); *Y02T 10/123* (2013.01); *Y02T 10/166* (2013.01)

(56) References Cited

U.S. PATENT DOCUMENTS

| | | | | |
|---|---|---|---|---|
| 8,485,162 | B2 * | 7/2013 | Ikeda | F01L 3/02 123/536 |
| 8,820,285 | B2 * | 9/2014 | Kaneko | F02P 9/007 123/143 B |
| 8,910,619 | B2 * | 12/2014 | Gingrich | F02P 23/045 123/143 B |
| 2010/0180871 | A1 * | 7/2010 | Ikeda | F02B 23/08 123/536 |
| 2011/0030347 | A1 * | 2/2011 | Ikeda | F01L 3/02 60/275 |
| 2011/0030660 | A1 * | 2/2011 | Ikeda | F02B 1/02 123/536 |
| 2012/0240873 | A1 * | 9/2012 | Ikeda | F02B 19/04 123/3 |
| 2013/0104861 | A1 * | 5/2013 | Roberts, Jr. | F02P 23/045 123/594 |
| 2014/0026839 | A1 * | 1/2014 | Ikeda | H05H 1/46 123/143 B |
| 2014/0190438 | A1 * | 7/2014 | Ikeda | F02P 3/01 123/146.5 R |
| 2014/0216381 | A1 * | 8/2014 | Ikeda | H05H 1/46 123/143 B |
| 2014/0248188 | A1 * | 9/2014 | Ikeda | B01D 53/92 422/170 |
| 2015/0068479 | A1 * | 3/2015 | Ikeda | F02P 3/01 123/143 B |
| 2015/0181687 | A1 * | 6/2015 | Ikeda | F02P 9/007 123/143 B |

* cited by examiner

INTERNAL COMBUSTION ENGINE

TECHNICAL FIELD

The Present invention relates to an internal combustion engine that promotes combustion of fuel injected from an injector to a combustion chamber by way of electromagnetic wave plasma.

BACKGROUND ART

Conventionally, there is known an internal combustion engine that promotes combustion of fuel injected from an injector to a combustion chamber by way of electromagnetic wave plasma (such as microwave plasma). For example, Japanese Unexamined Patent Application, Publication No. 2009-207549 discloses an internal combustion engine of this kind.

More particularly, in the internal combustion engine disclosed by Japanese Unexamined Patent Application, Publication No. 2009-287549, while a piston is in the vicinity of a top dead center, an injector injects fuel. Then, the injected fuel is ignited, and a flame is formed. A microwave pulse is supplied to a region in the vicinity of the flame, and electrons in the flame are energized and accelerated. The accelerated electrons collide with ambient molecules. The collision molecules are ionized to form plasma. Electrons in the plasma are also energized and accelerated, and ambient molecules collide with the electrons to form plasma. Thus, in the internal combustion engine, an avalanche-like plasma generation occurs. As a result of this, comparatively large microwave plasma is generated.

THE DISCLOSURE OF THE INVENTION

Problems to be Solved by the Invention

In a conventional internal combustion engine, a plurality of jet flows injected from an injector are respectively contacted with electromagnetic wave plasma. However, no particular consideration has been given to a configuration for forming a plurality of strong electric fields and generating electromagnetic wave plasma in each strong electric field.

The present invention has been made in view of above described circumstances, and it is an object of the present invention, in an internal combustion engine that promotes combustion of fuel injected from an injector to a combustion chamber by way of electromagnetic wave plasma, to generate a plurality of pieces of the electromagnetic wave plasma respectively for a plurality of jet flows injected from the injector.

Means for Solving the Problems

In accordance with a first aspect of the present invention, there is provided an internal combustion engine including: an internal combustion engine main body formed with a combustion chamber having accommodated therein a cylinder, in which a piston is reciprocatably fitted; an injector that includes a plurality of injection holes for injecting fuel in directions different from one another, and injects fuel to the combustion chamber from the injection holes; and a plasma generation device that includes an electromagnetic wave generator for generating an electromagnetic wave and an antenna for emitting to the combustion chamber the electromagnetic wave supplied from the electromagnetic wave generator, and is adapted to generate electromagnetic wave plasma by emitting the electromagnetic wave to the combustion chamber from the antenna; wherein the plasma generation device generates the electromagnetic wave plasma while the injector injects fuel. The antennae are provided in plural respectively for the plurality of injection holes of the injector. On an exposed surface of the piston exposed to the combustion chamber, each antenna is disposed at a location corresponding to each injection hole.

According to the first aspect of the present invention, the plurality of antennae are provided respectively for the plurality of injection holes of the injector. Each antenna is disposed on the exposed surface of the piston at the location corresponding to each injection hole. When the electromagnetic wave is supplied to each antenna, a strong electric field, which is relatively strong in electric field intensity in the combustion chamber, is formed in the vicinity of the antenna, and electromagnetic wave plasma is generated at the location of the strong electric field. The electromagnetic wave plasma is generated in the vicinity of each antenna. Since each antenna is arranged at a location corresponding to each injection hole, the electromagnetic wave plasma is generated at a location corresponding to each injection hole of the injector.

In accordance with a second aspect of the present invention, in addition to the first aspect of the present invention, the combustion chamber is configured to create a swirl, and a tip end of each antenna is disposed at a location displaced in a swirl direction from a straight line extending in an injection direction from each injection hole of the injector.

According to the second aspect of the present invention, the tip end of each antenna is disposed at the location displaced in the swirl direction from the straight line extending in the injection direction from each injection hole of the injector. The location of the tip end of each antenna is determined in view of the swirl direction.

In accordance with a third aspect of the present invention, in addition to the first aspect of the present invention, each antenna extends from each injection hole of the injector in an injection direction along the exposed surface of the piston.

According to the third aspect of the present invention, each antenna extends from each injection hole of the injector in the injection direction along the exposed surface of the piston. On the exposed surface of the piston, it is possible to supply electromagnetic wave energy over a wide range of passing region of a jet flow injected from each injection hole.

In accordance with a fourth aspect of the present invention, in addition to the third aspect of the present invention, the combustion chamber is configured to create a swirl, and each antenna is bent more sharply toward a direction of the swirl as a distance thereof from each injection hole of the injector increases.

According to the fourth aspect of the present invention, each antenna is bent more sharply in the swirl direction as a distance thereof from each injection hole of the injector increases. Each antenna, which extends in the injection direction from each injection hole on the exposed surface of the piston, is bent in view of the swirl direction.

In accordance with a fifth aspect of the present invention, in addition to the third or fourth aspect of the present invention, a transmission line for transmitting the electromagnetic wave from the electromagnetic wave generator to the antenna is provided with an adjustment unit that changes a location, which has relatively strong electric field intensity, on a surface of the antenna supplied with the electromagnetic wave.

According to the fifth aspect of the present invention, the transmission line for transmitting the electromagnetic wave is provided with the adjustment unit that changes a location, which has relatively strong electric field intensity, on the surface of the antenna supplied with the electromagnetic wave. Therefore, it is possible to change a location to generate the electromagnetic wave plasma in a region along the antenna.

In accordance with a sixth aspect of the present invention, in addition to any one of the first to fifth aspects of the present invention, the plasma generation device includes a discharger for causing a discharge in the combustion chamber, and is adapted to generate electromagnetic wave plasma by irradiating discharge plasma generated by the discharger with the electromagnetic wave from the antenna.

According to the sixth aspect of the present invention, electromagnetic wave plasma is generated by irradiating discharge plasma generated by the discharger with the electromagnetic wave from the antenna. The electromagnetic wave plasma can be generated even in a state without flame. According to the sixth aspect of the present invention, it is possible to cause the electromagnetic wave plasma to contact with fuel, which has been injected from the injector but not yet ignited.

In accordance with a seventh aspect of the present invention, in addition to any one of the first to fifth aspects of the present invention, the plasma generation device includes a glow plug for generating thermal electrons in the combustion chamber, and is adapted to generate electromagnetic wave plasma by accelerating the thermal electrons generated by the glow plug, by way of the electromagnetic wave emitted from the antenna.

According to the seventh aspect of the present invention, electromagnetic wave plasma is generated by accelerating the thermal electrons generated by the glow plug by way of the electromagnetic wave. The electromagnetic wave plasma can be generated even in a state without flame. According to the seventh aspect of the present invention, it is possible to cause the electromagnetic wave plasma to contact with fuel, which has been injected from the injector but not yet ignited.

Effects of the Invention

According to the present invention, since each antenna is arranged at a location corresponding to each injection hole of the injector, electromagnetic wave plasma is generated at a location corresponding to each injection hole. The antennae are provided in plural respectively for the plurality of injection holes. Therefore, it is possible to generate a plurality of pieces of electromagnetic wave plasma respectively for a plurality of jet flows injected from the plurality of injection holes of the injector.

Furthermore, according to the present invention, since the electromagnetic wave plasma is generated at a location corresponding to each injection hole of the injector, it is possible to cause the electromagnetic wave plasma to efficiently contact with fuel injected from each injection hole.

BEST MODE FOR CARRYING OUT THE INVENTION

Figure 1:
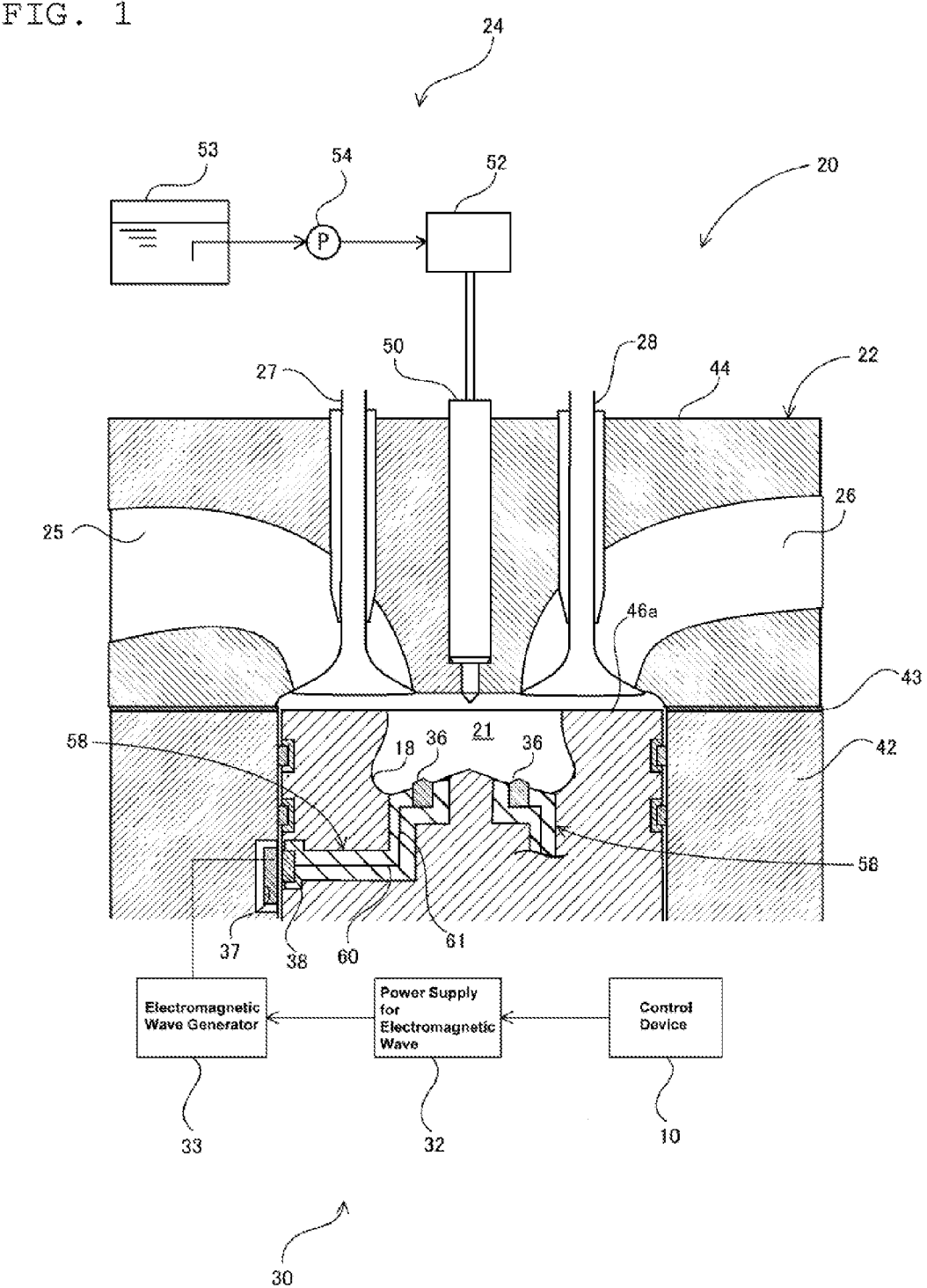
FIG. 1 is a vertical cross section view of an internal combustion engine according to a first embodiment.

In the following, a detailed description will be given of embodiments of the present invention with reference to drawings. It should be noted that the following embodiments are merely preferable examples, and do not limit the scope of the present invention, applied field thereof, or application thereof.

First Embodiment

The first embodiment is directed a compression ignition type internal combustion engine 20 that causes fuel to be compression ignited in a combustion chamber 21. The internal combustion engine 20 promotes combustion utilizing microwave, plasma. The internal combustion engine 20 is a mere example of the present invention. The internal combustion engine 20 is provided with an internal combustion engine main body 22, a fuel injection device 24, and a plasma generation device 30.

<Internal Combustion Engine Main Body>

As shown in FIG. 1, the internal combustion engine main body 22 is provided with a cylinder block 42, a cylinder head 44, and pistons 45. The cylinder block 42 is formed with a plurality of cylinders 48 each having a circular cross section. Inside of each cylinder 48, the piston 46 is reciprocatably mounted. The piston 46 is connected to a crankshaft (not shown) via a connecting rod (not shown). The crankshaft is rotatably supported by the cylinder block 42. While the piston 46 reciprocates in each cylinder 48 in an axial direction of the cylinder 48, the connecting rod converts the reciprocal movement of the piston 46 to rotational movement of the crankshaft.

The cylinder head 44 is placed on the cylinder block 42, and a gasket 43 intervenes between the cylinder block 42 and the cylinder head 44. The cylinder head 44 partitions the combustion chamber 21 along with the cylinder 48 and the piston 46. The cylinder head 44 is provided with one injector 50 for each cylinder 48. The injector 50 is arranged at a center of the ceiling surface of the combustion chamber 21. Details of the injector 50 will be described later.

The cylinder head 44 is formed with an intake port 25 and an exhaust port 26 for each cylinder 48. The intake port 25 is provided with an intake valve 27 for opening and closing the intake port 25. The intake port 25 is configured so as to create a swirl in the combustion chamber 21. On the other hand, the exhaust port 26 is provided with an exhaust valve 23 for opening and closing the exhaust port 26.

Figure 2:
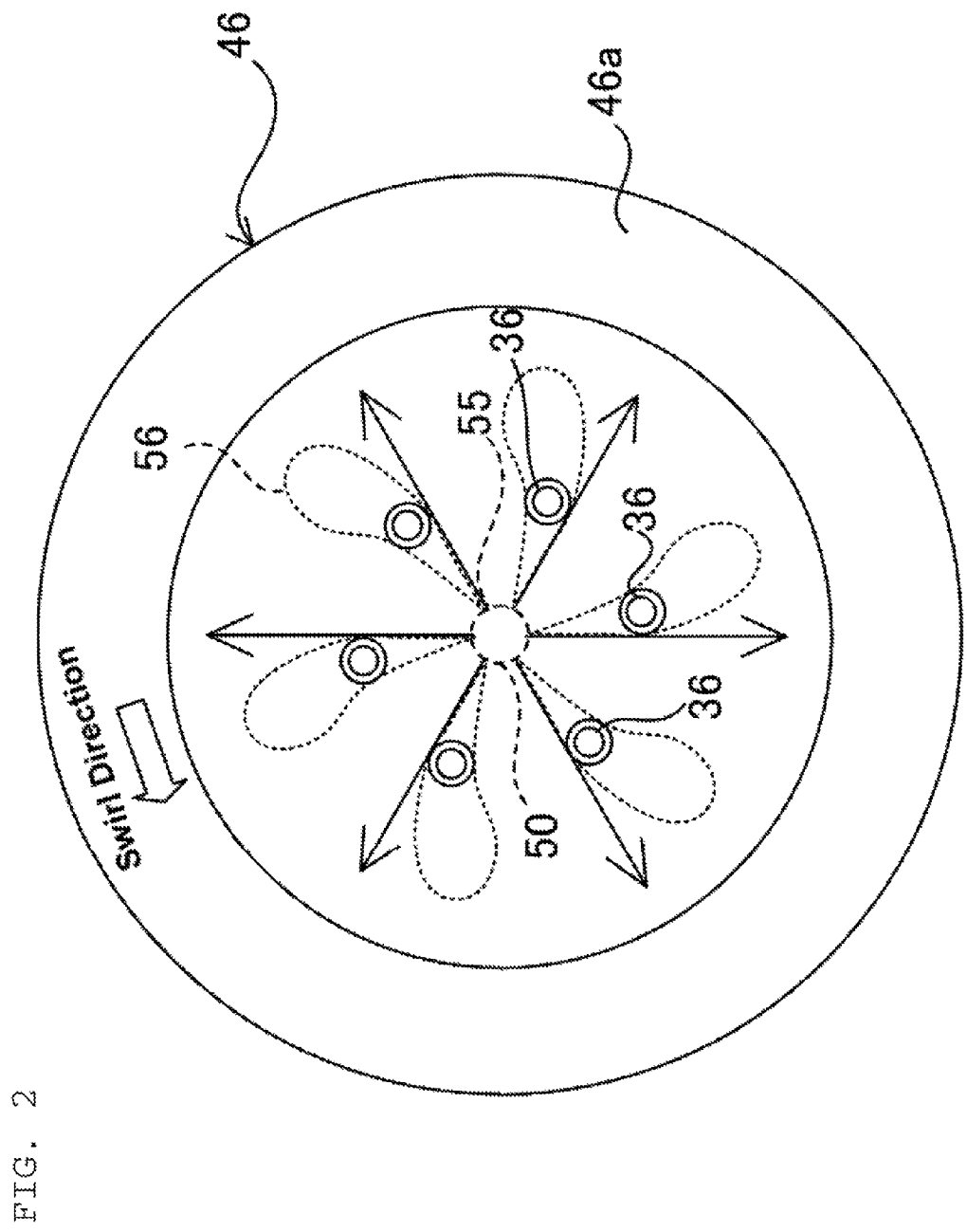
FIG. 2 is a top view of a piston of the internal combustion engine according to the first embodiment.

On the top surface of the piston 46, a cavity part 18 is formed to form the combustion chamber 21. As shown in FIG. 2, the cavity part 18 has an opening part in a circular shape. An inner peripheral surface of the cavity part 18 swells toward outside from an edge of the opening part. A center of the opening part coincides with an axial center of the piston 46. A bottom surface of the cavity part 18 is a circular cone protruding toward a side of the cylinder head 44. A center of the circular cone coincides with the axial center of the piston 46.

In the piston 46, the bottom surface and a side surface of the cavity part 18 constitute an exposed surface exposed to the combustion chamber 21 along with a region of the top surface of the piston 46 outside of the cavity part 18. A plurality of antennae 36 are disposed on the bottom surface of the cavity part 18 among the exposed surface. Details of the antenna 36 will be described later.

<Fuel injection Device>

The fuel injection device 24 is fixed to the internal combustion engine main body 22, and adapted to inject fuel to the combustion chamber 21. The fuel injection device 24 is a common rail type fuel injection device, and adapted to execute a multiple injection including a pilot injection, a pre-injection, a main injection, an after injection, and a post-injection for one combustion cycle.

As shown in FIG. 1, the fuel injection device 24 is provided with the injector 50 for each cylinder 48, an accumulator 52 for storing high pressure fuel to be supplied to each injector 50, and a supply pump 54 that pressurizes fuel from a fuel tank 53 and supplies it to the accumulator 52. The fuel injection device 24 is controlled by a control device 10.

The injector 50 includes a plurality of injection holes 55 (six injection holes in the first embodiment) for injecting fuel to the combustion chamber 21 in directions different from one another, and injects fuel to the combustion chamber 21 from each injection hole 55. The plurality of injection holes 55 are equiangularly arranged centering on an axial center of the injector 50. The injector 50 radially injects fuel. An injection direction, toward which fuel is injected, of each injection hole 55 is slightly downward (toward a side of the piston 46) rather than horizontal. From each injection hole 55, fuel is injected into the cavity part 18. A jet flow 56 injected from each injection hole 55 is bent due to the swirl.

<Plasma Generation Device>

While the injector 50 injects fuel, the plasma generation device 30 generates microwave plasma (electromagnetic wave plasma) by emitting microwaves to the combustion chamber 21. One plasma generation device 30 is provided for each cylinder 48.

As shown in FIG. 1, each plasma generation device 30 is provided with a power supply for electromagnetic wave 32, an electromagnetic wave generator 33, and an antenna 35. The electromagnetic wave generator 33 and the antenna 36 are paired and provided in the same number as the injection holes 55 of the injector 50.

The power supply for electromagnetic wave 32 is connected to a battery of a vehicle. The power supply for electromagnetic wave 32 converts a current from the battery into a pulse current and outputs it to each electromagnetic wave generator 33. The electromagnetic wave generator 33 may be, for example, a magnetron or a semiconductor oscillator. Each electromagnetic wave generator upon receiving the pulse current, outputs a microwave pulse to each antenna 36.

Each antenna 36 is disposed on the piston 46. Each antenna 36 is protruded from the bottom surface (circular cone surface) of the cavity part 18. The antennae 36 are disposed respectively for the injection holes 55 of the injector 50. As the antenna 36, a convex structure or a groove structure may be employed.

More particularly, as shown in FIG. 2, viewing the top surface of the piston 46 from above, each antenna 36 is located so that the let flow 55 injected from each injection hole 55 passes through the antenna 36. Each antenna 36 is disposed at a location displaced in a swirl direction from a straight line extending in the injection direction from each injection hole 55 of the injector 50. The location of each antenna 36 is determined in view of the swirl direction. As shown in FIG. 2, the jet flow 56 injected from each injection hole 55 is bent toward a counterclockwise direction due to swirl, and passes through the position of each antenna 36. Each antenna 36 is located at a position or outwardly in a radial direction of the piston 46 from the position where fuel injected from the injector 50 is ignited at a time of a specific operating condition of generating the microwave plasma.

A transmission line for transmitting the microwave from the electromagnetic wave generator 33 to the antenna 36 is capacitively connected between an inner peripheral surface of the cylinder 48 and an outer peripheral surface of the piston 46. Between the inner peripheral surface of the cylinder 48 and the outer peripheral surface of the piston 46, the transmission line is capacitively connected via a fixed conductor 37 connected to the electromagnetic wave generator 33 and a moving conductor 38 connected to the antenna 36. The fixed conductor 37 is fixed to the inner peripheral surface of the cylinder 48, and the moving conductor 38 is fixed to the outer peripheral surface of the piston 46. The lengths of the fixed conductor 37 and the moving conductor 38 are adjusted so that the fixed conductor 37 and the moving conductor 38 are always facing each other during a latter half of a compression stroke (while the piston 45 moves from a midpoint of a moving range to the top dead center).

Inside of the piston 45, an insulator 60 and a metal wire 61 constitute a coaxial line 58 for connecting the moving conductor 38 and the antenna 36.

The operation of the plasma generation device 30 will be described hereinafter. The plasma generation device 30 performs a plasma generation operation of generating the microwave plasma, under control of the control device 10.

In the plasma generation operation, while each injection hole 55 of the injector 50 injects fuel for the main injection, the control device 10 outputs an electromagnetic, wave generation signal. The power supply for electromagnetic wave 32, upon receiving the electromagnetic wave generation signal, outputs a pulse current for a predetermined time interval (1 ms, for example) at a predetermined duty cycle. Each electromagnetic wave generator 33 outputs a microwave pulse for the predetermined time interval at the predetermined duty cycle. Each antenna 36 emits the microwave pulse outputted from each electromagnetic wave generator 33 to the combustion chamber 21.

In the vicinity of a tip end of each antenna 36, a strong electric field, which has relatively strong electric field intensity in the combustion chamber 21, is formed. In the vicinity of the tip end of each antenna 36, fuel injected from each injection hole 55 of the injector 50 is ignited. Thus, in the vicinity of the tip end of each antenna 36, a flame is formed. In the strong electric field in the vicinity of the tip end of each antenna 36, elections in the flame are accelerated due to the microwave pulse. The accelerated electrons collide with ambient molecules. The collision molecules are ionized to form plasma. Electrons in the plasma are also accelerated due to the microwave pulse and ambient molecules collide with the electrons to form plasma. In this manner, in the strong electric field in the vicinity of the tip end of each antenna 36, an avalanche-like plasma generation occurs, and comparatively large plasma is generated.

In the plasma generation device 30, impedance matching is performed so that intensity of a reflected wave of the microwave is weakened while the microwave plasma is generated. In each antenna 36, a standing wave has an antinode at the tip end, where an electric field is relatively strong in intensity.

When the predetermined time interval has elapsed since the rise time of the electromagnetic wave generation signal, the microwave pulse generation is terminated, and the microwave plasma disappears. The time interval is configured so that the microwave plasma should be maintained until the jet flow 56 injected from each injection hole 55 of the injector 50 has passed through the tip end of the antenna 36.

<Effect of First Embodiment>

In the first embodiment, since each antenna 36 is arranged at a location corresponding to each injection hole 55 of the injector 50, microwave plasma is generated at a location corresponding to each injection hole 55. The antennae 36 are provided in plural respectively for the plurality of injection holes 55. Therefore, it is possible to generate a plurality of pieces of the microwave plasma respectively for the plurality of jet flows 56 injected from the plurality of injection holes 55 of the injector 50. As a result of this, oxidation reaction of fuel injected from each injection hole 55 is promoted, and consequently, combustion is promoted.

Furthermore, in the first embodiment, since the microwave plasma is generated at a location corresponding to each injection hole 55 of the injector 50, it is possible to cause the microwave plasma to effectively contact with fuel injected from each injection hole 55. Especially, since each antenna 36 is mounted to the piston 46, it is possible to cause the microwave plasma to effectively contact with fuel injected toward the piston 46.

Furthermore, in the first embodiment, since the location of each antenna 36 is determined in view of the swirl direction, the jet flow 5 bent due to the swirl passes through the vicinity of the tip end of each antenna 36. Therefore, it is possible to cause the microwave plasma to effectively contact with the jet, flow 56.

First Modified Example of First Embodiment

The following description is directed to a first modified example, of the first embodiment. In the first modified example, the plasma generation device 30 is provided with a pulse generator 31 and a discharger 35 along with the power supply for electromagnetic wave 32, the electromagnetic wave generator 33, and the antenna 3. The plasma generation device 30 generates microwave plasma by irradiating discharge plasma generated by way of the discharger 35 with the microwave from Dm the antenna 35.

More particularly, the pulse generator 31 is connected to a battery mounted on a vehicle on which the internal combustion engine 20 is mounted). The pulse generator 31 may be, for example, an ignition coil. The pulse generator 31, upon receiving a discharge signal from the control device 10, boosts a voltage applied from the battery, and outputs the boosted high voltage pulse to the discharger 35.

Figure 3:
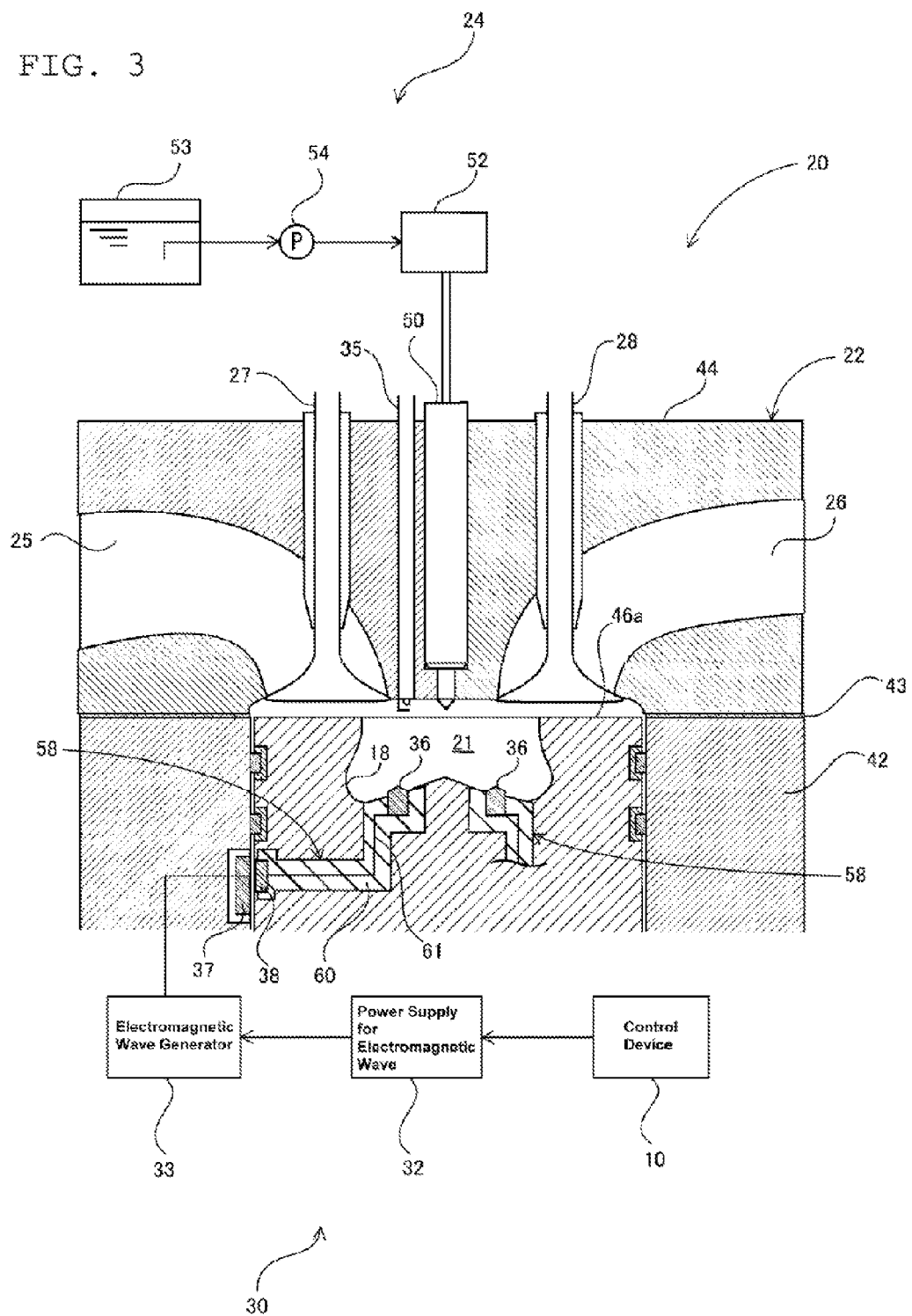
FIG. 3 is a vertical cross section view of an internal combustion engine according to a first modified example of the first embodiment.

The discharger 35 may be, for example, a spark plug. The discharger 35 is provided with a discharge electrode, electrically connected to the pulse generator 31, and a ground electrode that forms a discharge gap along with the discharge electrode. As shown in FIG. 3, the discharger 35 is attached to a ceiling surface of the combustion chamber 21, and adapted to cause a discharge in the combustion chamber 21. The discharger 35 is juxtaposed to the injector 50.

In the plasma generation operation, while each injection hole 55 of the injector 50 injects fuel, the control device 10 outputs the discharge signal to the pulse generator 31 and the electromagnetic wave generation signal to the power supply for electromagnetic wave 32 at the same time. More strictly, the control device 10 outputs the electromagnetic wave generation signal slightly prior to the discharge signal.

The power supply for electromagnetic wave 32, upon receiving the electromagnetic wave generation signal, outputs a pulse current for a predetermined time interval at a predetermined duty cycle. The electromagnetic wave generator 33 outputs a microwave pulse for the predetermined time interval at the predetermined duty cycle. The antenna 36 emits the microwave pulse outputted from the electromagnetic wave generator 33 to the combustion chamber 21. Meanwhile, the pulse generator 31, upon receiving the discharge signal, outputs a high voltage pulse. The discharger 35, upon receiving the high voltage pulse from the pulse generator 31, causes a spark discharge at the discharge gap.

In the plasma generation operation, a start timing of emitting the microwave pulse to the combustion chamber 21 is prior to the spark discharge, and an end timing of emitting the microwave pulse to the combustion chamber 21 is posterior to the spark discharge. The spark discharge occurs at a point of time during the emission period of the microwave pulse. During the emission period of the microwave pulse, a strong electric field, which has relatively strong electric field intensity in the combustion chamber 21, is formed in the vicinity of the tip end of the antenna 36. Therefore, electrons emitted from gas ionized due to the spark discharge are, effectively accelerated in the vicinity of the tip end of the antenna 36, and microwave plasma is generated in the vicinity of the tip end of the antenna 36. The microwave plasma contacts with the jet flow 56, which is passing through the vicinity of the tip end of the antenna 36. As a result of this, oxidation reaction of fuel is promoted, and thus, combustion is promoted.

In the first modified example, the microwave plasma can be generated even in a state without flame. Therefore, it is possible, to cause the microwave plasma to contact with fuel, which has been injected from the injector 50 but not yet ignited. Each antenna 36 is arranged at a position or inwardly in a radial direction of the piston 46 from the position where fuel injected from the injector 50 is ignited at a time of a specific operating condition of generating the microwave plasma.

In place of the discharger 35, a glow plug for generating thermal electrons in the combustion chamber 21 may be employed. The glow plug may be mounted in a main combustion chamber in the cylinder, or may be mounted in a sub combustion chamber, which is held in communication with the main combustion chamber. The plasma generation device 30 generates the microwave plasma by accelerating thermal electrons, which has been generated by the glow plug, by means of the microwave emitted from the antenna 36.

Second Modified Example of First Embodiment

Figure 4:
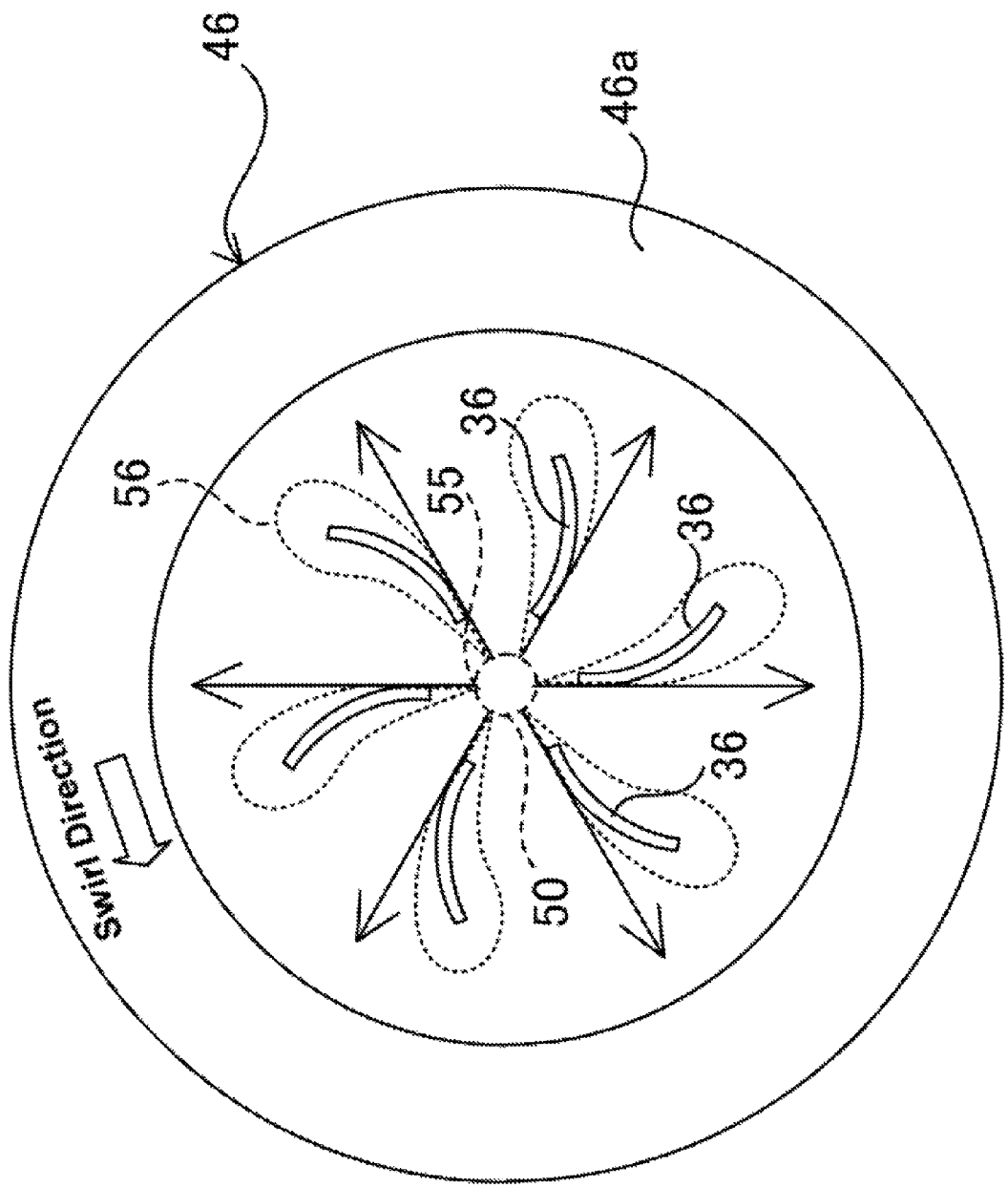
FIG. 4 is a top view of a piston of the internal combustion engine according to a second modified example of the first embodiment.

The following description is directed to a second modified example of the first embodiment. As shown in FIG. 4, in the second modified example, the antennae 36 are mounted so as to extend along an exposed surface 46a of the piston 46 exposed to the combustion chamber 21.

Each antenna 36 extends from each injection hole 55 of the injector 50 in a fuel injection direction. An outer part of each antenna 36 is bent toward a swirl direction. Each antenna 36 is be more sharply toward the swirl direction at a location where the distance thereof from each injection hole 55 of the injector 50 increases. An inner end of each antenna 36 is connected to a coaxial line 58, which partly constitutes the transmission line for electromagnetic wave.

Also, each antenna 36 may extend straight in the fuel injection direction from each injection hole 55 of the injector 50.

In the second modified example, on the exposed surface 46a of the piston 46, each antenna 36 extends along a passing region, which the let flow 56 injected from each injection hole 55 of the injector 50 passes through. Accordingly, it is possible to supply microwave energy over a wide range of the passing region of the let flow 56 on the exposed surface 45a of the piston 46. Therefore, it is possible to supply the Jet flow 58 with microwave energy for a relatively long time while the Jet flow 56 is diffusing.

Furthermore, in the second modified example, since the coaxial line 58 is connected to the inner end of each antenna 36, an outer end of each antenna 36 serves as a tip end of the antenna 36. In the plasma generation device 30, impedance matching is performed so that a reflected wave of the microwave should be weakened in intensity when the microwave plasma is being generated. In each antenna 36, a standing wave has an antinode at the outer end, where an electric field becomes relatively strong in intensity. Therefore, when each antenna 36 is supplied with the microwave pulse, microwave plasma is generated in the vicinity of the outer end of each antenna 36. In the second modified example, electrons in a diffusion flame are supplied with energy of the microwave pulse from the vicinity of a center of each antenna 36, where the jet flow 55 is ignited, and the jet flow 56 contacts with the microwave plasma in the vicinity of the outer end of each antenna 36.

Although, in the second modified example, the inner end of each antenna 36 is connected to the coaxial line 53, the outer end of each antenna 36 may be connected to the coaxial line 58 so that the microwave plasma should be generated in the vicinity of the inner end of each antenna 36. In this case, fuel at a position where the microwave plasma is to be generated is not yet ignited due to ignition delay. Therefore, similarly to the first modified example of the first embodiment, while the injector 50 injects fuel, the discharger 35 causes a discharge and, at the same time, each antenna 3 emits the microwave pulse to the combustion chamber 21, thereby generating the microwave plasma.

Furthermore, the transmission line for electromagnetic wave may be provided with an adjustment unit adapted to change a location of a strong electric field, which has relatively strong electric field intensity, on a surface of the antenna 36, which is supplied with the microwave. As the adjustment unit, a stub may be employed that is connected to the transmission line. By changing electrical length of the stub, the location of the strong electric field is changed on a surface of the antenna 36, which is supplied with the microwave. Therefore, it is possible to change a location to generate the microwave plasma in a region along the antenna 36. For example, the microwave plasma may be moved along the antenna 36 from the inner end to the outer end according to diffusion of the jet flow 56.

Second Embodiment

Figure 5:
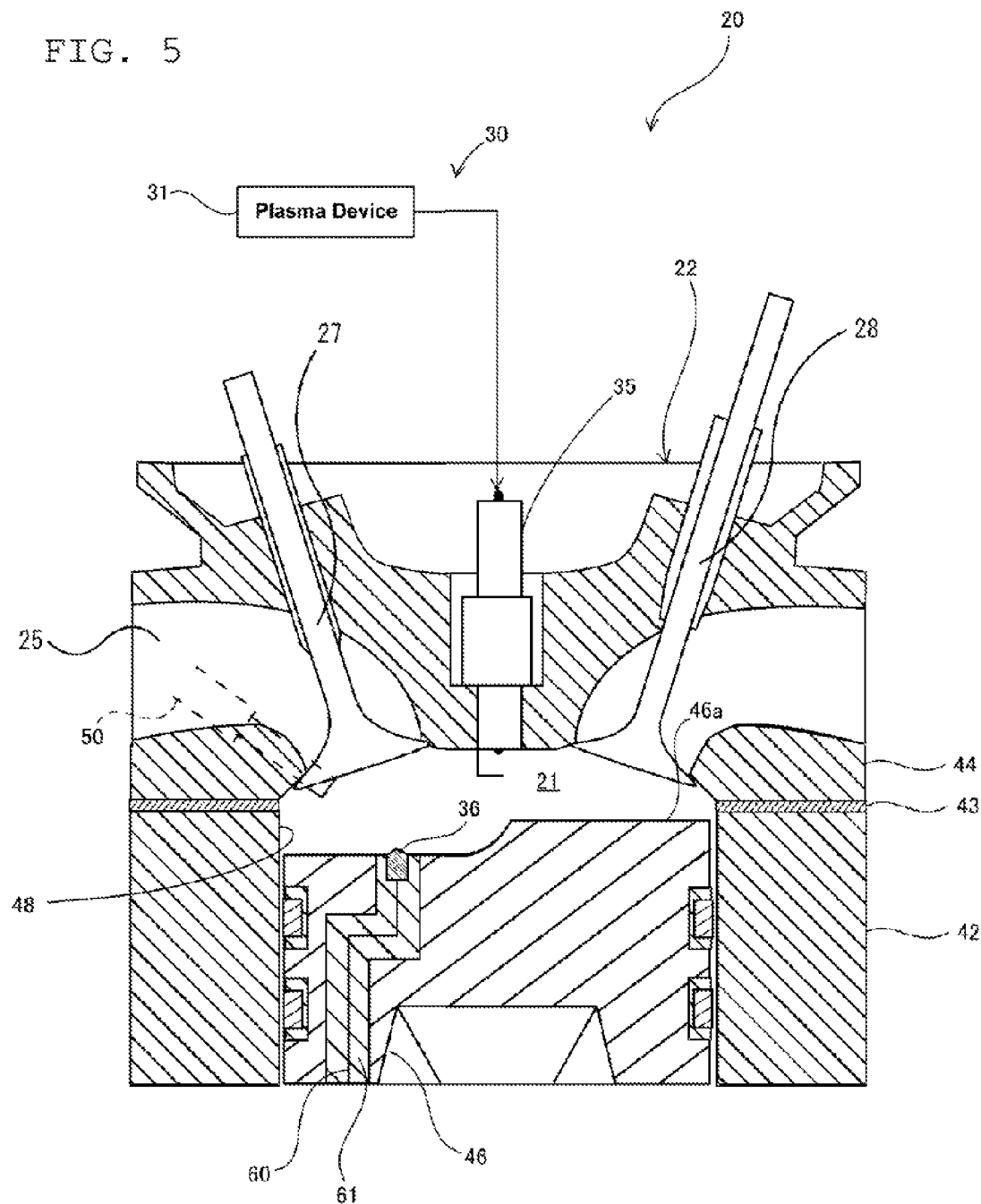
FIG. 5 is a vertical cross section view of an internal combustion engine according to a second embodiment.

The following description is directed to a second embodiment. An internal combustion engine 20 according to the second embodiment is a spark ignition type direct injection engine, as shown in FIG. 5. In the internal combustion engine 20, an injector 50 protrudes toward a combustion chamber 21 from between openings of two intake ports 25. The injector 50 includes a plurality (three, in the second embodiment) of injection holes 55 for injecting fuel in directions different from one another. The injector 50 injects fuel toward a top surface of a piston 46.

Figure 6:
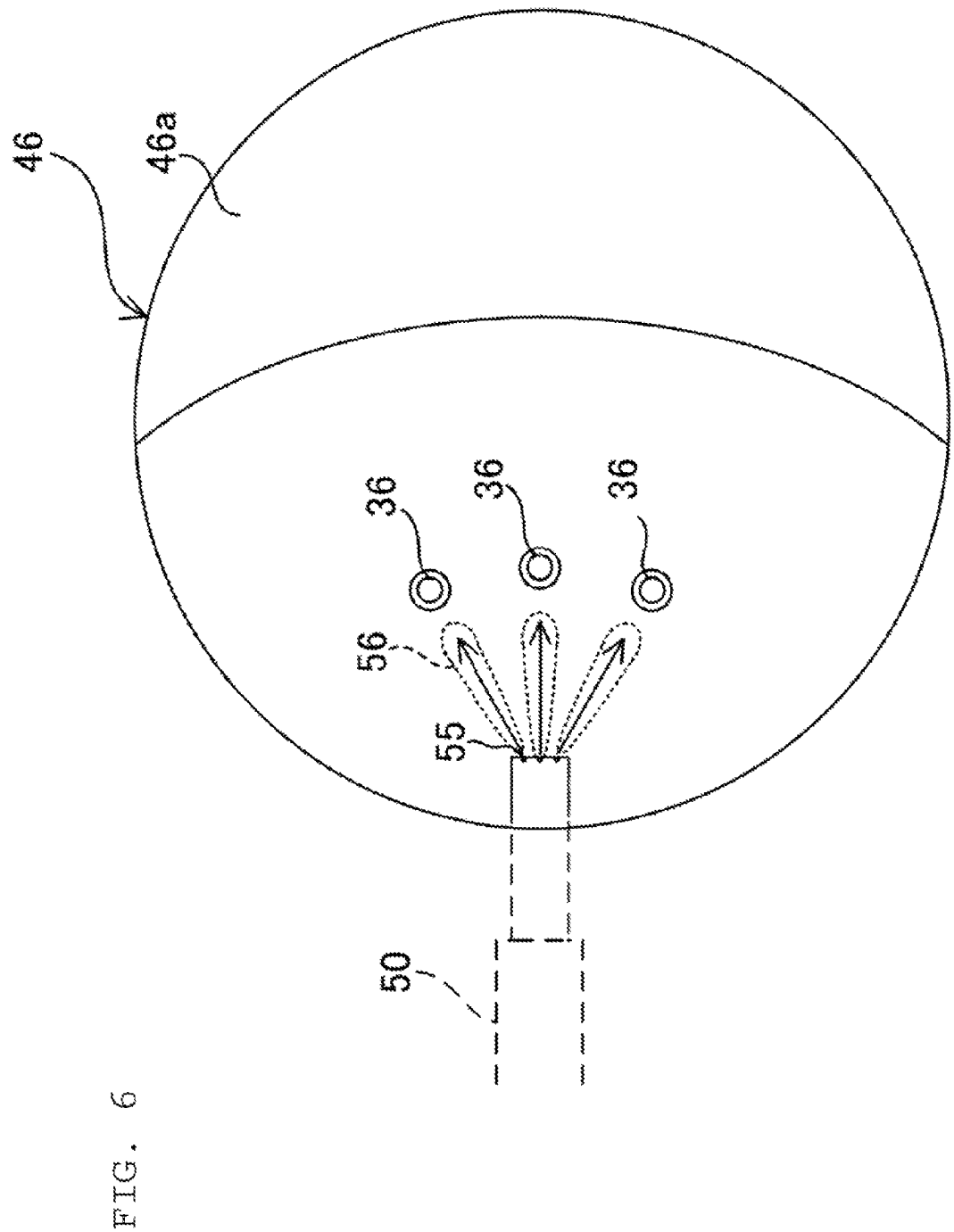
FIG. 6 is a top view of a piston of the internal combustion engine according to the second embodiment.

Pairs of electromagnetic wave generators 33 (not shown in FIG. 5) and antennae 36 are provided in the same number as the injection holes 55 of the injector 50. Each antenna 36 protrudes from a top surface of the piston 46. Each antenna 36 is disposed in correspondence to each injection hole 55 of the injector 50. More particularly, as shown in FIG. 6, viewing the top surface of the piston 4 from above, each antenna 36 is disposed at a location where a jet flow 55 injected from each injection hole 55 passes through.

Also, each antenna 35 may be disposed so as to extend in an injection direction from each injection hole 55 of the injector 50 along the exposed surface 46a of the piston 45, as in the second modified example, of the first embodiment.

Similarly to the first modified example of the first embodiment, while the injector 50 injects fuel, a plasma generation device 30 generates microwave plasma by causing a discharge at a spark plug 35 (discharger) and simultaneously emitting a microwave pulse to the combustion chamber 21 from each antenna 36. As a result of this, since the microwave plasma contacts with the jet flow 56 injected from each injection hole 55 of the injector 50, oxidation reaction of fuel is promoted, and thus, combustion is promoted. In the second embodiment, the spark plug 35, which constitutes an ignition device of the internal combustion engine 20, serves as the plasma generation device 30 as well.

Other Embodiments

The above described embodiments may also be configured as follows.

In the first embodiment described above, the microwave plasma may also be generated for injection other than the main injection (i.e., the pre-injection, the pilot injection, the after injection, and the post-injection).

In the embodiments described above, the plurality of antennae 36 may be supplied with electromagnetic waves from a single electromagnetic wave generator 33.

INDUSTRIAL APPLICABILITY

The present invention is useful in relation to an internal combustion engine that promotes combustion of fuel injected to a combustion chamber from an injector by way of electromagnetic wave plasma.

EXPLANATION OF REFERENCE NUMERALS

20 Internal Combustion Engine
30 Plasma Generation Device
36 Antenna
46 Piston
46a Exposed Surface
50 Injector
55 injection Hole
56 Jet Flow

What is claimed is:
1. An internal combustion engine, comprising: an internal combustion engine main body formed with a combustion chamber having accommodated therein a cylinder in which a piston is reciprocatably fitted,
an injector that includes a plurality of injection holes for injecting fuel in directions different from one another, and injects fuel to the combustion chamber from each injection hole, and
a plasma generation device that includes an electromagnetic wave generator for generating an electromagnetic wave and an antennae for emitting the electromagnetic wave supplied from the electromagnetic wave generator to the combustion chamber, and is adapted to generate electromagnetic wave plasma by emitting the electromagnetic wave from the antenna to the combustion chamber, wherein
the plasma generation device generates the electromagnetic wave plasma while the injector injects fuel, the antennae are provided in plural respectively for the plurality of injection holes of the injector, and each antenna is disposed at a location on an exposed surface of the piston exposed of the combustion chamber corresponding to each injection hole.

2. The internal combustion engine according to claim 1, wherein the combustion chamber is configured to create a swirl, and a tip end of each antenna is disposed at a location displaced in a swirl direction from a straight line extending in an injection direction from each injection hole of the injector.

3. The internal combustion engine according to claim 1, wherein each antenna extends from each injection hole of the injector in an injection direction along the exposed surface of the piston.

4. The internal combustion engine according to claim 3, wherein the combustion chamber is configured to create a swirl, and each antenna is bent more sharply toward a direction of the swirl as a distance thereof from each injection hole of the injector increases.

5. The internal combustion engine according to claim 3, wherein a transmission line for transmitting the electromagnetic wave from the electromagnetic wave generator to the antenna is provided with an adjustment unit that changes a location which has relatively strong electric field intensity, on a surface of the antenna supplied with the electromagnetic wave.

6. The internal combustion engine according to claim 1, wherein the plasma generation device includes a discharger for causing a discharge in the combustion chamber, and is adapted to generate electromagnetic wave plasma by irradiating discharge plasma generated by the discharger with the electromagnetic wave from the antenna.

7. The internal combustion engine according to claim 1, wherein the plasma generation device includes a glow plug for generating thermal electrons in the combustion chamber, and is adapted to generate electromagnetic wave plasma by accelerating the thermal electrons generated by the glow plug, by way of the electromagnetic wave emitted from the antenna.

8. The internal combustion engine according to claim 4, wherein a transmission line for transmitting the electromagnetic wave from the electromagnetic wave generator to the antenna is provided with an adjustment unit that changes a location which has relatively strong electric field intensity, on a surface of the antenna supplied with the electromagnetic wave.

9. The internal combustion engine according to claim 2, wherein the plasma generation device includes a discharger for causing a discharge in the combustion chamber, and is adapted to generate electromagnetic wave plasma by irradiating discharge plasma generated by the discharger with the electromagnetic wave from the antenna.

10. The internal combustion engine according to claim 3, wherein the plasma generation device includes a discharger for causing a discharge in the combustion chamber, and is adapted to generate electromagnetic wave plasma by irradiating discharge plasma generated by the discharger with the electromagnetic wave from the antenna.

11. The internal combustion engine according to claim 4, wherein the plasma generation device includes a discharger for causing a discharge in the combustion chamber, and is adapted to generate electromagnetic wave plasma by irradiating discharge plasma generated by the discharger with the electromagnetic wave from the antenna.

12. The internal combustion engine according to claim 5, wherein the plasma generation device includes a discharger for causing a discharge in the combustion chamber, and is adapted to generate electromagnetic wave plasma by irradiating discharge plasma generated by the discharger with the electromagnetic wave from the antenna.

13. The internal combustion engine according to claim 2, wherein the plasma generation device includes a glow plug for generating thermal electrons in the combustion chamber, and is adapted to generate electromagnetic wave plasma by accelerating the thermal electrons generated by the glow plug, by way of the electromagnetic wave emitted from the antenna.

14. The internal combustion engine according to claim 3, wherein the plasma generation device includes a glow plug for generating thermal electrons in the combustion chamber, and is adapted to generate electromagnetic wave plasma by accelerating the thermal electrons generated by the glow plug, by way of the electromagnetic wave emitted from the antenna.

15. The internal combustion engine according claim 4, wherein the plasma generation device includes a glow plug for generating thermal electrons in the combustion chamber, and is adapted to generate electromagnetic wave plasma by accelerating the thermal electrons generated by the glow plug, by way of the electromagnetic wave emitted from the antenna.

16. The internal combustion engine according to claim 5, wherein the plasma generation device includes a glow plug for generating thermal electrons in the combustion chamber, and is adapted to generate electromagnetic wave plasma by accelerating the thermal electrons generated by the glow plug, by way of the electromagnetic wave emitted from the antenna.

* * * * *